Jan. 14, 1941.   H. O. PARSONS   2,228,481
DEVICE FOR SAMPLING AND GAUGING LIQUIDS IN CLOSED CONTAINERS
Filed March 8, 1938   2 Sheets-Sheet 1
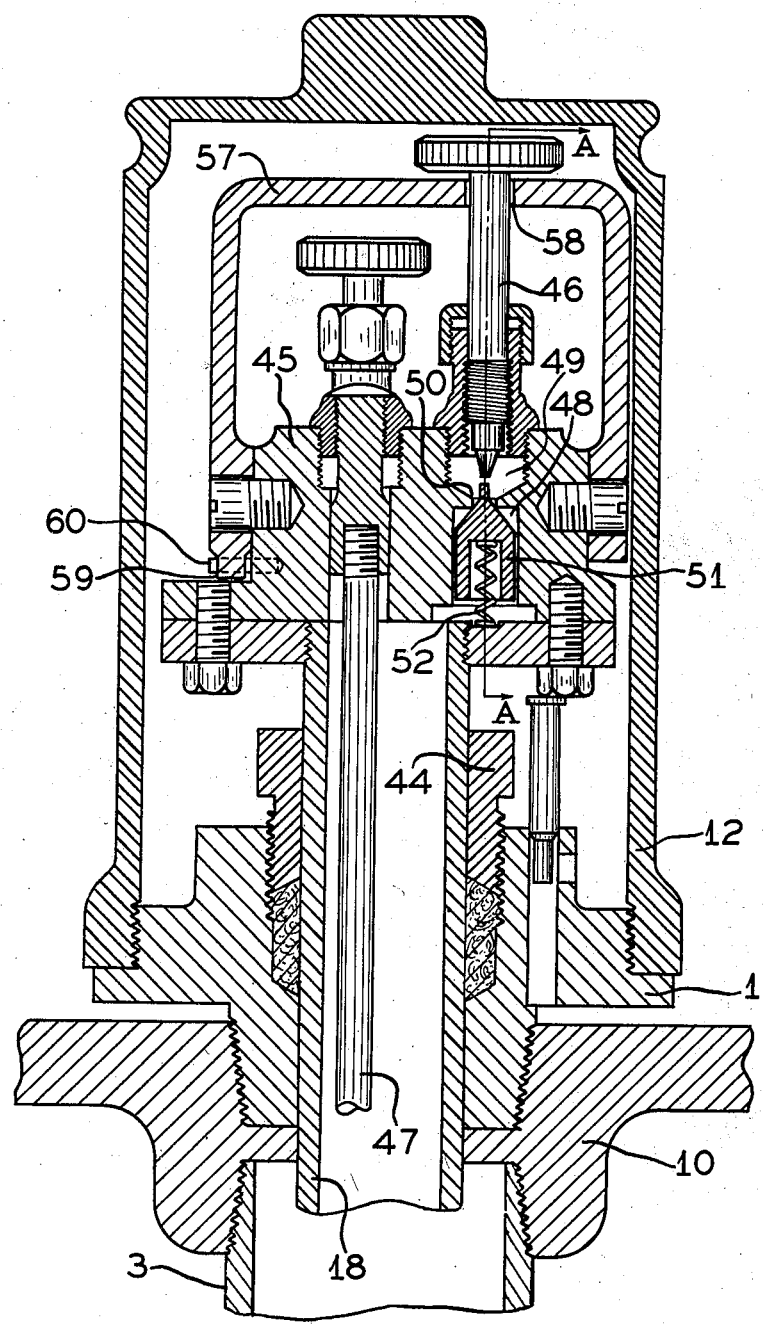
FIG_1
Harrison O. Parsons INVENTOR.
BY
P. L. Young ATTORNEY.

Jan. 14, 1941.  H. O. PARSONS  2,228,481
DEVICE FOR SAMPLING AND GAUGING LIQUIDS IN CLOSED CONTAINERS
Filed March 8, 1938  2 Sheets-Sheet 2
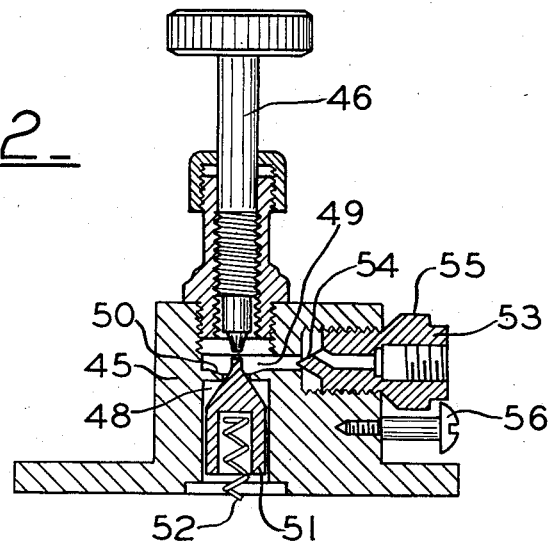
FIG_2_
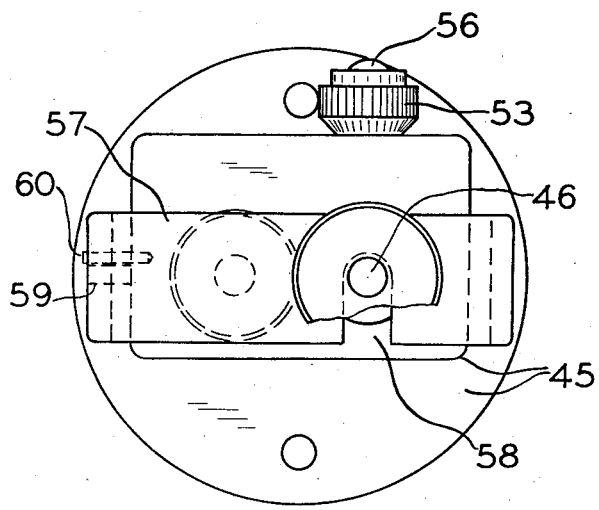
FIG_3_
Harrison O. Parsons, INVENTOR.
BY P. L. Young, ATTORNEY.

Patented Jan. 14, 1941

2,228,481

UNITED STATES PATENT OFFICE 2,228,481

DEVICE FOR SAMPLING AND GAUGING LIQUIDS IN CLOSED CONTAINERS

Harrison O. Parsons, Houston, Tex.

Application March 8, 1938, Serial No. 194,541

6 Claims. (Cl. 251—6)

The present invention relates to a device for gauging and sampling fluids stored in systems under abnormal pressure conditions and is directed specifically to means for preventing leaks from such systems.

In my co-pending application, Ser. No. 170,555, filed October 23, 1937, I have described a gauging and sampling device of the above described character comprising a chamber provided with a sight glass for gauging the liquid level of a fluid in a container and a valve controlled outlet from said chamber for the withdrawal of a sample of the fluid. In the use of this device difficulty has been encountered by reason of the fact that the valve covering the outlet from the gauging chamber is sometimes inadvertently left open or is worked loose by vibration during the transportation of the container to which it is attached, thereby entailing a considerable loss of fluid when the latter is of a volatile nature as it usually is in the containers to which the gauging and sampling device is applicable. Moreover, the escape of this fluid constitutes a fire hazard and may subject the owner of the container to heavy penalties.

The principal object of the present invention is the provision of means for insuring that the sampling outlet of the gauging chamber of the device described in my co-pending application shall always be in closed position when it is not in use.

Further objects and advantages of the present invention will appear from the accompanying drawings in which—

Figure 1 is a vertical section through the head of the gauging and sampling tube to which the improvement of the present invention is applied;

Figure 2 is a section along the line A—A of Figure 1; and

Figure 3 is a plan view of the head shown in Figure 1 with the cap removed.

In referring in detail to the accompanying drawings, parts corresponding to parts shown in the drawing of my co-pending application, Serial No. 170,555 will be referred to by the same numeral in order to clarify the connection between the cases.

Referring to Figure 1 in detail, 3 represents the upper section of the outer wall of the gauging and sampling device and is connected to the base member 11 by a coupling member 10. The upper end 18 of the gauging tube is slidingly mounted in packing gland 44 of base member 11 and is provided with a head 45 which carries the valve 46 which will hereinafter be referred to in greater detail, and the valve 47 which is used to equalize the pressure inside the gauging chamber with that outside the chamber. Mounted on the base member 11 is a cap 12 adapted to cover the valve assembly.

The construction, according to the present invention, differs from that shown in my co-pending application in the following respects. In the passage 48 are provided shoulders 50 which form a slot for a valve 51 which is pressed upwardly against the shoulders by a spring 52. The valve stem 46 is provided with left-handed threads. The reason for this is that conventional valves are opened by turning counterclockwise and closed by turning clockwise. If stem 46 were provided with right-handed threads its operation would be the reverse of that of conventional valves. Consequently, it is convenient to employ left-handed threads in this case.

The passage 48 connects with passage 49 on the end of which is seated a valve 53 which is in the form of a screw threaded plug having a conical projection 54 at its forward end which projection is adapted to seat at the end of passage 52. The fluid passage through the valve 53 begins at the base of the conical projection and passes through the center of the plug. The outer end of the plug is provided with a circumferential shoulder 55 which is adapted to abut against a ledge 56, in this case the head of a screw, to limit outward motion of the plug. The plug 53 is of such dimensions that when it is in closed position its outer end is flush with the inside surface of cap 12. That is to say, cap 12 cannot be screwed into place unless the valve 53 is in closed position.

Pivotally mounted on the head 45 is a bail 57 of such shape and dimension that it is capable of only slight movement from its vertical position when cap 12 is in place. As shown in the drawings, one side of bail 57 fits fairly snugly against the side wall of cap 12 when the bail is in vertical position. Due to the curvature of the wall of cap 12 the bail cannot move substantially out of vertical position. Conversely, the cap 12 cannot be set in place unless the bail is in substantially vertical position. The bail is provided with a recess 58 to receive the stem of valve 46. Thus, the bail cannot be placed in vertical position unless valve 46 is in closed position. Consequently, the bail prevents the setting of cap 12 in place unless valve 46 is in closed position. The bail is also provided at one end with a lug 59 adapted to abut against a stop 60 arranged in head 45 so as to limit the movement of the bail.

It can be seen, therefore, that according to the present invention two safeguards are provided against the closing of the assembly while there is an open passage for fluid from the interior of the container and the exterior of the base member. Each of these safeguards is directly associated with the operation of the valve assembly. Each of them operates on the principle of preventing the covering of the assembly by the cap 12 until the fluid passages are closed.

Various changes in the above described arrangement may occur to those skilled in the art. All changes in arrangement of parts and size or design of individual elements which do not involve a departure from the basic principles underlying the present invention are contemplated within the scope of the appended claims in which it is intended to claim the invention as broadly as the prior art permits.

I claim:

1. In a device for sampling liquids from containers comprising a tubular member adapted to project into the container, a base member closing the exposed end of said tubular member, a passage through said base member, a valve controlling said passage and a cap member adapted to fit over said base member, in combination, a rod carrying a hand knob for controlling the position of said valve, said knob being in its outermost position when the valve is closed, and a bail pivoted on said base member and provided with a recess for receiving said rod when the bail is in an upright position, said bail being of such dimensions that the cap cannot be set in place unless the bail is in an upright position.

2. In a device for sampling liquids from containers comprising a tubular member adapted to project into the container, a base member closing the exposed end of said tubular member, a passage through said base member and a cap member adapted to fit over said base member, in combination, a valve for controlling said passage comprising a screw-threaded plug, the plug being so arranged with respect to the base member and having its head of such dimensions that the cap cannot be set on the base member unless the valve is in closed position.

3. A device for sampling liquids from containers comprising a tubular member adapted to project into the container, a base member closing the exposed end of said tubular member, a passage through said base member, a flange projecting inwardly into said passage, a valve member in said passage spring-pressed upwardly against said flange, a screw-threaded stem carried by said base member in a position to push said valve member off of said flange when it is screwed downwardly and a bail secured to said base member having a recess to receive said stem when the latter is in closed-valve position.

4. In a device for sampling liquids from containers comprising a tubular member adapted to project into the container, a base member closing the exposed end of said tubular member, a passage through said base member and a cap member of cylindrical cross section adapted to fit over said base member, in combination, a valve for controlling said passage comprising a screw-threaded plug arranged with its axis at substantially right angles with the axis of the cap member and having a head of such dimensions that the cap cannot be set on the base member unless the valve is in a closed position.

5. A device for sampling liquids from containers comprising a tubular member adapted to project into the container, a base member closing the exposed end of said tubular member, a passage through said base member, a valve member controlling said passage, a rod carrying a hand knob for controlling the position of said valve, said knob being in its outermost position when the valve is closed, and a bail pivoted on said base member having a recess, the recess fitting around the rod and under the hand knob when the valve is in a closed position and the bail is in a vertical position.

6. A device for sampling liquids from containers comprising a tubular member adapted to project into the container, a base member closing the exposed end of said tubular member, a cap member adapted to fit over said base member, a first valve controlling said passage, a rod for controlling the position of said valve, a bail pivoted on said base member and provided with a recess for receiving said rod when the valve is closed and the bail is in an upright position, said bail being of such dimensions that the cap cannot be set in place unless the bail is in an upright position, a second valve for controlling said passage comprising a screw-threaded plug having a head of such dimensions that the cap cannot be set on the base member unless said second valve is in a closed position.

HARRISON O. PARSONS.